United States Patent
McFadyen et al.

(10) Patent No.: US 8,730,610 B2
(45) Date of Patent: May 20, 2014

(54) CLOSED LOOP FLY HEIGHT CONTROL

(75) Inventors: James McFadyen, Redwood City, CA (US); Kiem Nguyen, San Jose, CA (US); Jingbo Yu, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 11/751,135

(22) Filed: May 21, 2007

(65) Prior Publication Data

US 2007/0268615 A1    Nov. 22, 2007

Related U.S. Application Data

(60) Provisional application No. 60/747,829, filed on May 22, 2006.

(51) Int. Cl.
*G11B 21/02* (2006.01)
(52) U.S. Cl.
USPC .......................................................... 360/75
(58) Field of Classification Search
None
See application file for complete search history.

(56) References Cited

U.S. PATENT DOCUMENTS

| | | | | |
|---|---|---|---|---|
| 5,130,866 A * | 7/1992 | Klaassen et al. | | 360/75 |
| 5,991,113 A * | 11/1999 | Meyer et al. | | 360/75 |
| 6,801,376 B2 * | 10/2004 | Smith | | 360/31 |
| 6,865,040 B2 * | 3/2005 | Fayeulle et al. | | 360/31 |
| 6,950,266 B1 * | 9/2005 | McCaslin et al. | | 360/75 |
| 6,972,919 B2 * | 12/2005 | Suk | | 360/75 |
| 7,027,251 B1 * | 4/2006 | Darragh et al. | | 360/75 |
| 7,088,545 B1 * | 8/2006 | Singh et al. | | 360/75 |
| 7,092,193 B1 * | 8/2006 | McKenzie et al. | | 360/75 |
| 7,180,692 B1 * | 2/2007 | Che et al. | | 360/31 |
| 7,436,619 B2 * | 10/2008 | Takahashi | | 360/75 |

OTHER PUBLICATIONS

The IEEE Standard Dictionary of Electrical and Electronics Terms, 6th Edition, 1997, p. 879.*
Microsoft Press Computer Dictionary, 3rd ed., 1997, p. 399.*

* cited by examiner

*Primary Examiner* — K. Wong
(74) *Attorney, Agent, or Firm* — HolzerIPLaw, PC

(57) ABSTRACT

A distance between a head and a storage media is measured. An amount of power applied to a heater element in the head is adaptively adjusted based on a difference between the measured distance and a reference position indicating a desired distance between the head and the storage media. Related circuits and devices are also discussed.

19 Claims, 5 Drawing Sheets

CLOSED LOOP FLY HEIGHT CONTROL

RELATED APPLICATION

This application claims the benefit of and priority to U.S. Provisional Patent Application No. 60/747,829, filed May 22, 2006, the disclosure of which is hereby incorporated by reference herein as if set forth in its entirety.

FIELD

The present invention generally relates to sensor clearance control and, more particularly, to controlling fly height of a read/write head.

BACKGROUND

Data storage devices, such as disk drives, may allow host computers to store and retrieve large amounts of data in a fast and efficient manner. A typical disk drive may include a plurality of magnetic recording disks, which may be mounted to a rotatable hub of a spindle motor and rotated at a high speed. An array of read/write heads may be disposed adjacent to data storage surfaces of the disks to transfer data between the disks and a host computer. The heads can be radially positioned over the disks by a rotary actuator and a closed loop servo system, and can fly in close proximity to the surfaces of the disks upon air bearings. The heads each typically contain a separate read element and write element.

Higher data storage density on the disks may be obtained by reading and writing data on narrower tracks on the disks, and/or by maintaining narrower flying height gaps between the heads and the data storage surfaces. The flying height of a head, i.e., the distance or spacing between the head and a surface of the adjacent disk, can vary in response to environmental conditions, such as temperature and/or pressure variations in the disk drive, and/or in response to head temperature variations. These changes can affect the distance that the tip of the head protrudes therefrom (i.e., pole tip protrusion). Maintaining the head flying height within a desired or acceptable range may become increasingly more difficult as that range is reduced to obtain higher data storage densities. Operation outside the acceptable range may result in an unacceptable read/write bit error rate and/or undesirable contact between a head and a data storage surface, and thus, potential loss of data and/or damage to the data storage surface.

Accordingly, some disk drives may controllably heat the head using a heater element to vary the flying height of the head. More particularly, dynamically controlled fly height or Fly Height Adjust (FHA) may be achieved using a heater element, such as an actuation coil, built into the head. When power is applied to the coil, the FHA head may protrude towards the disk. As such, by adjusting the power applied to the heater element, a fly height between the head and the disk surface can be maintained in a variety of changing environmental conditions, for example, due to changes in temperature, barometric pressure, etc.

For FHA heads, fly height may be adjusted in an open loop manner (i.e., without a feedback signal from the head) within a predetermined range of actuation. The amount of power compensation applied to the heater element may be determined based on a model or expected relationship between fly height and temperature and/or pressure. As such, temperature and/or pressure sensors may be required to determine the amount of power compensation for fly height adjustment. In addition, the accuracy of the compensation may be limited by the accuracy of the model. As such, variations in the actual heads from those of the model may lead to erroneous compensation.

For non-FHA heads, fly height may also be maintained in an open loop manner, for example, based on the air bearing surface (ABS) of the head. The ABS is used to build pressure to lift the head from the disk surface during normal drive operation, and is designed to keep the fly height within a certain range over varying environmental conditions to provide acceptable magnetic performance. However, the actual fly height may vary within the range based on the environmental conditions, which may thereby affect read and/or write performance. Tighter ranges may provide improved performance, but may lead to increased component costs. Moreover, if fly height is not within the desired range, non-FHA heads may be discarded, which may increase production costs.

SUMMARY

According to some embodiments, a distance between a head and a storage media may be measured, and a signal applied to a heater element in the head may be adaptively adjusted based on a difference between the measured distance and a reference position. The reference position may indicate a desired distance between the head and the storage media.

According to other embodiments, a method may include measuring a distance between a head and a storage media and adaptively adjusting a signal applied to a heater element in the head based on a difference between the measured distance and a reference position. The reference position may indicate a desired distance between the head and the storage media.

According to further embodiments, a circuit includes a controller that measures a distance between a head and a storage media and adaptively adjusts a signal applied to a heater element in the head based on a difference between the measured distance and a reference position indicating a desired distance between the head and the storage media.

According to still further embodiments, a disk drive includes a rotatable data storage disk, a head that is adjacent to the rotatable storage disk, a heater element in the head, and a controller. The controller measures a distance between the head and the disk and adaptively adjusts a signal applied to the heater element based on a difference between the measured distance and a reference position indicating a desired distance between the head and the disk.

According to yet other embodiments, a feedback signal indicating a present distance between a head and a rotatable storage disk is received. An adjustment signal is provided to the head responsive to the feedback signal. The adjustment signal is based on the present distance relative to a reference position indicating a desired distance between the head and the storage media. A fly height of the head is adaptively adjusted to reduce a difference between the present distance and the reference position responsive to the adjustment signal.

DETAILED DESCRIPTION

Figure 1:
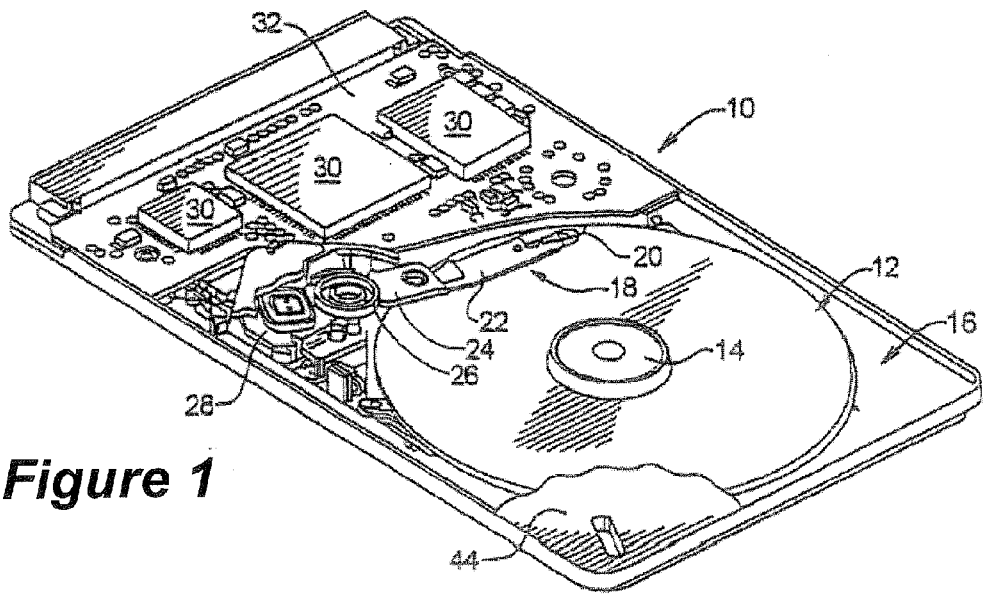
FIG. 1 is a perspective view of a disk drive including electronic circuits in accordance with some embodiments.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will convey the scope of the invention to those skilled in the art. The terminology used in the detailed description of the particular exemplary embodiments illustrated in the accompanying drawings is not intended to be limiting of the invention.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings. Like numbers refer to like elements throughout the description of the figures.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show what may be a primary direction of communication, it is to be understood that communication may occur in the opposite direction to the depicted arrows.

Some embodiments of the present invention provide methods and devices for controlling fly height accurately, efficiently, and without substantially impacting areal density and/or performance as seen by a user. More particularly, the distance or spacing between the head and the disk may be monitored during drive operation relative to a reference position indicating a desired fly height, and the amount of power applied to a heater element inside the head may be adaptively adjusted to drive the head back to the reference position. As such, fly height may be adjusted independent of the environmental conditions based on the relative difference between the measured spacing and the reference position.

Figure 2:
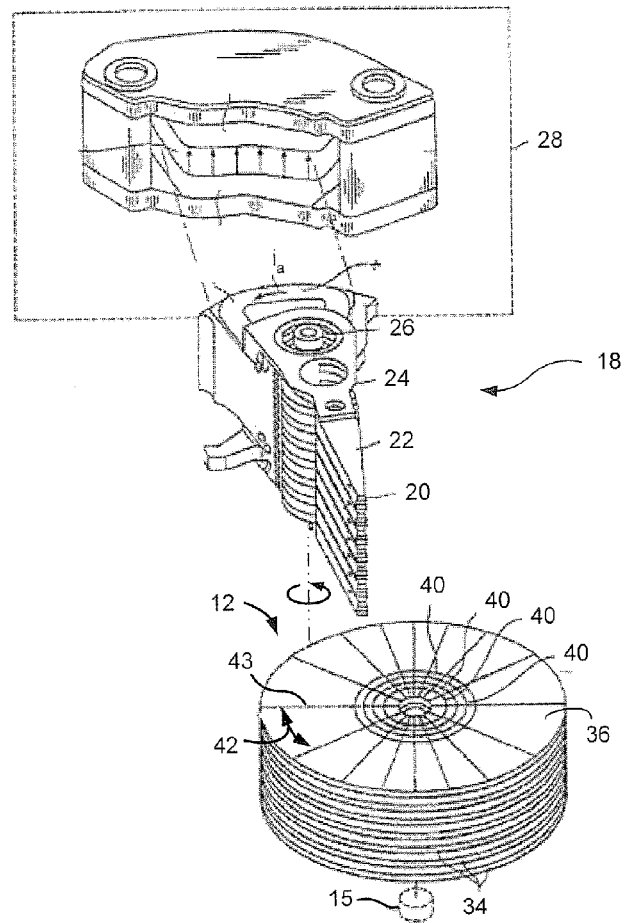
FIG. 2 is a diagram of an exemplary head disk assembly of the disk drive.

A simplified diagrammatic representation of a disk drive, generally designated as 10, is illustrated in FIG. 1. The disk drive 10 includes a disk stack 12 (illustrated as a single disk in FIG. 1) that is rotated about a hub 14 by a spindle motor 15 (FIG. 2). The spindle motor 15 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 15.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks 40 and spokes 43 on the disks 34. Data is stored on the disks 34 within a number of concentric tracks 40 (or cylinders). Each track 40 is divided into a plurality of radially extending sectors 42 separated by radially extending spokes 43. Each sector is further divided into a servo sector and a data sector. The servo sectors of the disks 34 are used, among other things, to accurately position the head 20 so that data can be properly written onto and read from a selected one of the disks 34. The servo sectors may include a DC erase field, a preamble field, a servo address mark field, a track number field, a spoke number field, and a servo burst field (e.g., circumferentially staggered and radially offset A, B, C, D servo bursts). The data sectors are where data received as part of a host-initiated write command is stored, and where data can be read in response to a host-initiated read command. In addition, one or more of the tracks 40 may include a specific bit pattern that may be used for measuring spacing between the head and the disk surface. For example, the bit pattern may be a 6 T bit pattern (i.e., repetitively occurring sets of 6+1 bits followed by 6−1 bits) written on a dedicated calibration track used for measuring the magnetic spacing between a read/write element of the head 20 and a magnetic layer of the disk 34. In some embodiments, the bit pattern may be written on one or more of the tracks 40 during a manufacturing process and/or during factory testing of the disk drive 10.

Figure 3:
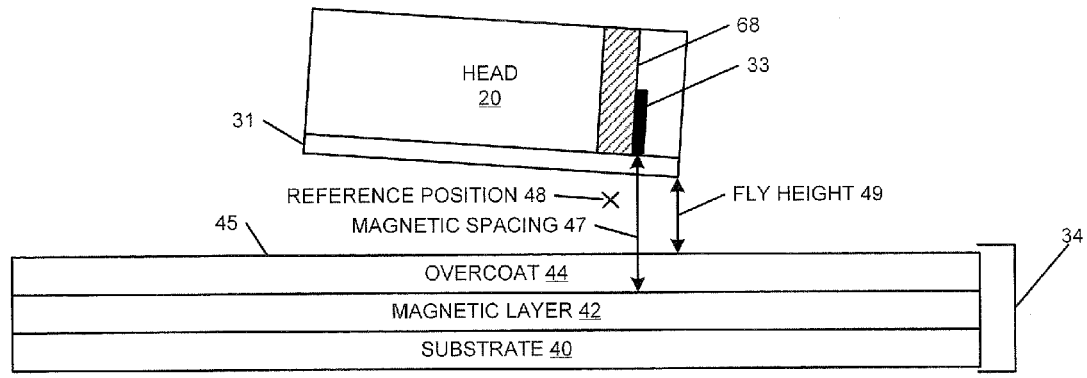
FIG. 3 is a block diagram illustrating flying characteristics of a head relative to a disk according to some embodiments.

FIG. 3 is a block diagram illustrating flying characteristics of a head 20 relative to disk for 34 according to some embodiments. Fly height control of the head 20 will also be discussed with reference to the flowchart of FIG. 5. Referring now to FIG. 3, a head 20 includes a read/write element 33, an air bearing surface (ABS) 31, and a heater element 68. For example, the read/write element 33 may include a thin film write element and a magnetoresistive (MR) read element. The disk 34 includes a substrate 40, a magnetic layer 42 on the substrate 40, and an overcoat layer 44 on the magnetic layer 42. During a reading and/or writing operation, the head 20 is positioned on a desired track of the disk 34 at a desired fly height 49 above the disk surface 45. As used herein, the fly height 49 refers to the distance between the air bearing surface (ABS) of the head 20 and the surface 45 of the disk 34. As such, the fly height 49 may refer to the physical clearance between the head 20 and the disk 34. In contrast, the magnetic spacing 47 refers to the distance between the read/write element 33 of the head 20 and the magnetic layer 42 of the disk 34.

Accordingly, the fly height 49 of the head 20 may be dynamically controlled during operation of the disk drive 10 by measuring a distance between the head 20 and the disk 34 or other storage media (at block 505). More particularly, the present magnetic spacing 47 between the read/write element 33 of the head 20 and the magnetic layer 42 of the disk 34 may be measured in a non-contact manner, for example, based on a read signal from a calibration track on the disk 34. As used herein, "present" distances, positions, and/or spacings are determined in real-time, during drive operation. In some embodiments, the present magnetic spacing 47 may be measured using the Wallace model, which is well-known to those of skill in the art; however, other methods may also be used.

The distance between the head 20 and the disk 34 may be measured periodically, intermittently, and/or at predetermined times. In some embodiments, the present distance between the head 20 and the disk 34 may be measured in response to detecting changes in environmental conditions, such as temperature and/or pressure. For example, as air pressure may change rapidly in a pressurized aircraft cabin, the present magnetic spacing 47 between the head 20 and the disk 34 may be measured more frequently based on the changes in pressure. In addition, the distance between the head 20 and the disk 34 may be measured responsive to detecting a read and/or write error rate is greater than a predetermined threshold.

A signal applied to the heater element 68 in the head 20 is adaptively adjusted based on the measured distance relative to a reference position indicating a desired distance between the head 20 and the disk 34 (at block 510). More particularly, the present magnetic spacing 47 between the read/write element 33 and the magnetic layer 42 of the disk 34 may be compared with a reference position 48 that corresponds to a desired fly height of the head 20. For example, during a disk drive manufacturing and/or testing process, the reference position 48 may be determined based on an initial measurement of a magnetic spacing corresponding to the desired fly height from the calibration track on the disk 34. Accordingly, an amount of power applied to the heater element 68 may be adaptively adjusted based on the comparison to reduce a difference between the present magnetic spacing 47 and the reference position 48, to thereby drive the head 20 back to the reference position 48 and maintain the head 20 at the desired fly height. Thus, a substantially constant fly height may be maintained (within the dynamic range of the FHA actuation) using a closed loop control system. In addition, in some embodiments, the fly height may be maintained without monitoring temperature and/or pressure variations. The operations of FIG. 5 may be interruptible, for example, when a host data transfer command is issued, to reduce and/or minimize impact to disk drive operation.

Figure 4:
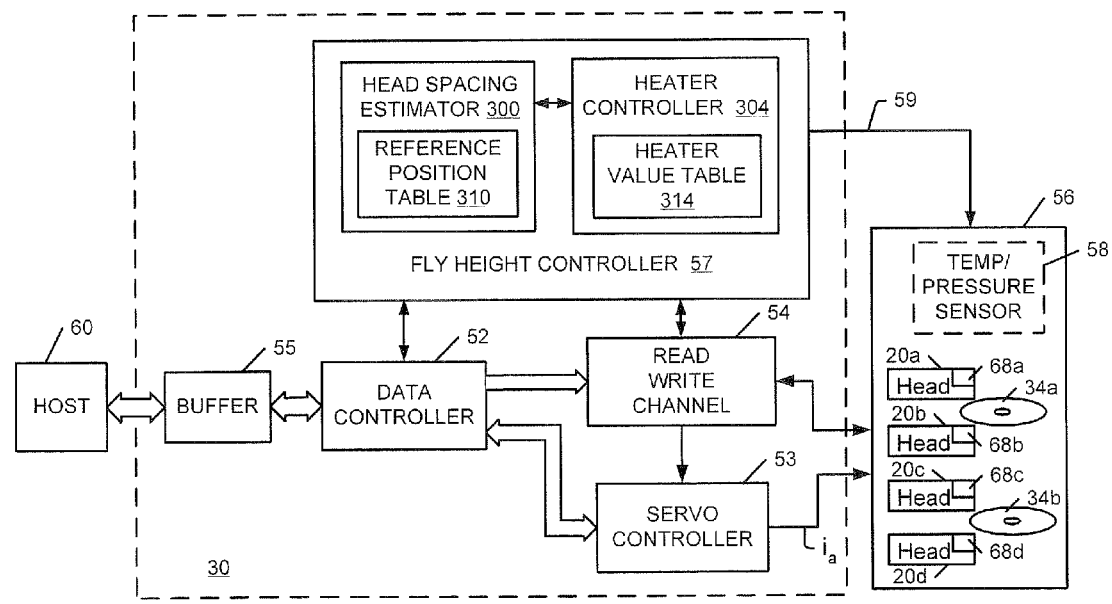
FIG. 4 is a block diagram of a portion of the controller of the disk drive shown in FIG. 1 and associated methods in accordance with some embodiments.

FIG. 4 is a block diagram of a host device 60 that is communicatively connected to a portion of the controller 30 of the disk drive 10 shown in FIG. 1 according to some embodiments. Operations of the controller 30 of FIG. 4 will also be discussed with reference to the flowchart of FIG. 6. Referring now to FIG. 4, the controller 30 can include a data controller 52, a servo controller 53, a read write channel 54, a buffer 55, and a fly height controller 57. Although the controllers 52, 53, and 57, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34a-b, a plurality of the heads 20a-d mounted to the actuator arm assembly 18 and positioned adjacent to different data storage surfaces of the disks 34a-b, the VCM 28, and the spindle motor 15. In general, there may be two heads per disk. Thus, in a 4-disk platter drive, there may be eight heads. In some embodiments, the HDA 56 may also include a temperature/pressure sensor 58 used to measure changes in the air temperature and/or pressure during reading and/or writing operations of the disk drive 10.

Write commands and associated data from the host device 60 are buffered in the buffer 55. The data controller 52 is configured to carry out buffered write commands by formatting the associated data into blocks, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form of a write current conducted through a selected head 20 in the HDA 56. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34, and to maintain the head 20 aligned with the track while data is written/read on the disk 34.

When a head 20 is selected for reading/writing, its fly height is typically above an acceptable flight height range where the head 20 should be located when reading/writing data on the disk 34. Accordingly, in response to selection of a head 20, the fly height controller 57 heats the head 20 using a heater element 68 to lower the head fly height to within the acceptable range. Upon reaching the acceptable range, reading/writing may be carried out through the selected head 20 while regulating heating by the heater element 68 to attempt to maintain the fly height within the acceptable range.

In accordance with some embodiments, the fly height controller 57 includes a head spacing estimator 300 and a heater controller 304. The heater controller 304 controls heating of the head 20 by a heater element 68. The head spacing estimator 300 measures a distance between the head 20 and the adjacent disk 34. The head spacing estimator 300 may regulate head heating by the heater controller 304 based on the measured distance relative to a desired distance between the head 20 and the disk 34 to attempt to maintain the head 20 at a desired fly height.

More particularly, the heater controller 304 controls head fly height by regulating the power that is provided to a heater element, such as an actuation coil, that heats a selected head. With reference to FIG. 4, the HDA 56 may include a plurality of heater elements 68a-d attached, or otherwise thermally connected, to respective ones of the heads 20a-d. The heater controller 304 generates a heater power or height adjustment signal 59 which is conducted through one or more of the heater elements 68a-d to generate heat therefrom and, thereby, heat corresponding ones of the heads 20a-d. The heater controller 304 regulates the height adjustment signal 59 to individually control heating of the heads 20a-d and cause a desired movement or displacement of the heads 20a-d towards and/or away from the respective surfaces of the disks 34a-b, and thereby separately control fly heights of the heads 20a-d. Although a single height adjustment signal 59 from the heater controller 304 is illustrated in FIG. 4, it is to be understood that additional height adjustment signals 59 may be used to separately control heating by the respective heater elements 68a-d and that, for example, the heater elements 68a-d may be respectively controlled by individual height adjustment signals 59.

The head spacing estimator 300 includes a reference position table 310. The reference position table 310 includes respective reference positions corresponding to desired fly heights for one or more of the heads 20 a-d relative to the corresponding disks 34a-b. For example, the head spacing estimator 300 may determine a reference position for the head 20a by measuring a desired magnetic spacing between a read/write element of the head 20a and a magnetic layer 42 of the adjacent disk 34a corresponding to the desired fly height. The head spacing estimator 300 may store the desired magnetic spacing as a reference position for the head 20a in the table 310. The reference positions stored in the table 310 may be used to maintain desired fly heights for the heads 20a-d based on comparisons with feedback signals from the heads 20a-d, as discussed in detail below.

The head spacing estimator 300 may measure desired magnetic spacings for one or more of the heads 20a-d during manufacturing and/or testing of the disk drive 10, for example, during drive self-test (ST). As such, the desired magnetic spacings may be determined under known and/or controlled temperatures, air pressures, and/or other conditions. The spacings for one or more of the heads 20a-d may be measured indirectly in a non-contact manner, for example, based on changes in a read signal. More particularly, the drive controller 30 may write a calibration track including a predetermined bit pattern on the disk 34 during a servo track writing process. The calibration track may be a service track that is not otherwise used by the disk drive 10 for storage of user data. As such, the servo controller 53 may position a selected head 20a on the calibration track (at block 605), and the head spacing estimator 300 may calculate the desired magnetic spacing based on a read signal from the calibration track (at block 610). The head spacing estimator 300 may store the desired magnetic spacing as a reference position in the table 310 (at block 615). Thus, the stored reference position may indicate a desired magnetic spacing under known and/or controlled conditions, and as such, may be used for comparison with subsequent measurements based on read signals from the calibration track.

For example, the bit pattern on the calibration track may be a 6 T pattern (i.e., repetitively occurring sets of 6+1 bits followed by 6−1 bits), where T is a time duration computed based upon a reference clock having a predetermined frequency. It will be noted that the calibration track may otherwise be similar to the other tracks of the disk 34a, such that the 6 T pattern may be written to the user data fields, and the servo controller 53 may use the periodically interspersed servo fields to maintain the head 20a nominally over the center of the calibration track. In some, embodiments, to reduce the impact on areal density, five calibration tracks may be used to measure fly height at the inner diameter (ID) side of each physical data zone on each disk surface. These bands of calibration tracks may provide sufficient radial resolution to address fly height changes across the stroke. Within each band of calibration tracks, a calibration track may be written once during the self-test process with a 6 T pattern over the full track. The additional tracks may be guard band tracks that may be used to reduce and/or avoid adjacent track erasure (ATE) effects. Accordingly, respective magnetic spacings corresponding to desired reference positions for each of the heads 20a-d may be individually measured by positioning each head on the calibration track of a corresponding disk and reading the particular bit pattern encoded on the track, and the reference positions may be stored in the reference position table 310. In order to reduce and/or minimize the effect of thermal decay, a relatively long delay may be provided between the writing of the calibration tracks and reading of the calibration tracks to establish the reference position. In instances where it may not be feasible to provide a sufficient delay, the projected thermal decay may be accounted for in storing the reference position in the reference position table 310.

The head spacing estimator 300 may also use the bit pattern on the calibration tracks to measure the magnetic spacings between the heads 20a-d and the disks 34a-b in subsequent closed loop fly height measurements, for example during disk drive operation. More particularly, during disk drive operation, the servo controller 53 may again position the head 20a on the calibration track (at block 620), and the head spacing estimator 300 may measure a present magnetic spacing between a read/write element of the head 20a and a magnetic layer of the disk 34a based on a read signal from the calibration track (at block 625). For example, the head spacing estimator 300 may determine the magnitudes of one or more harmonic frequency components of the read signal generated based on the periodic bit pattern. As head flying height may have a differing effect on the magnitudes of the different harmonic frequency components, the head spacing estimator 300 may compare the relative magnitudes of the harmonic components to effectively determine the present magnetic spacing of the head 20a. The head spacing estimator 300 may determine the present magnetic spacing of the head 20a periodically, intermittently, at predetermined times, responsive to detecting changes in environmental conditions (such as changes in temperature and/or pressure), and/or responsive to detecting a read and/or write error rate that is greater than a predetermined threshold.

Figures 5, 6:
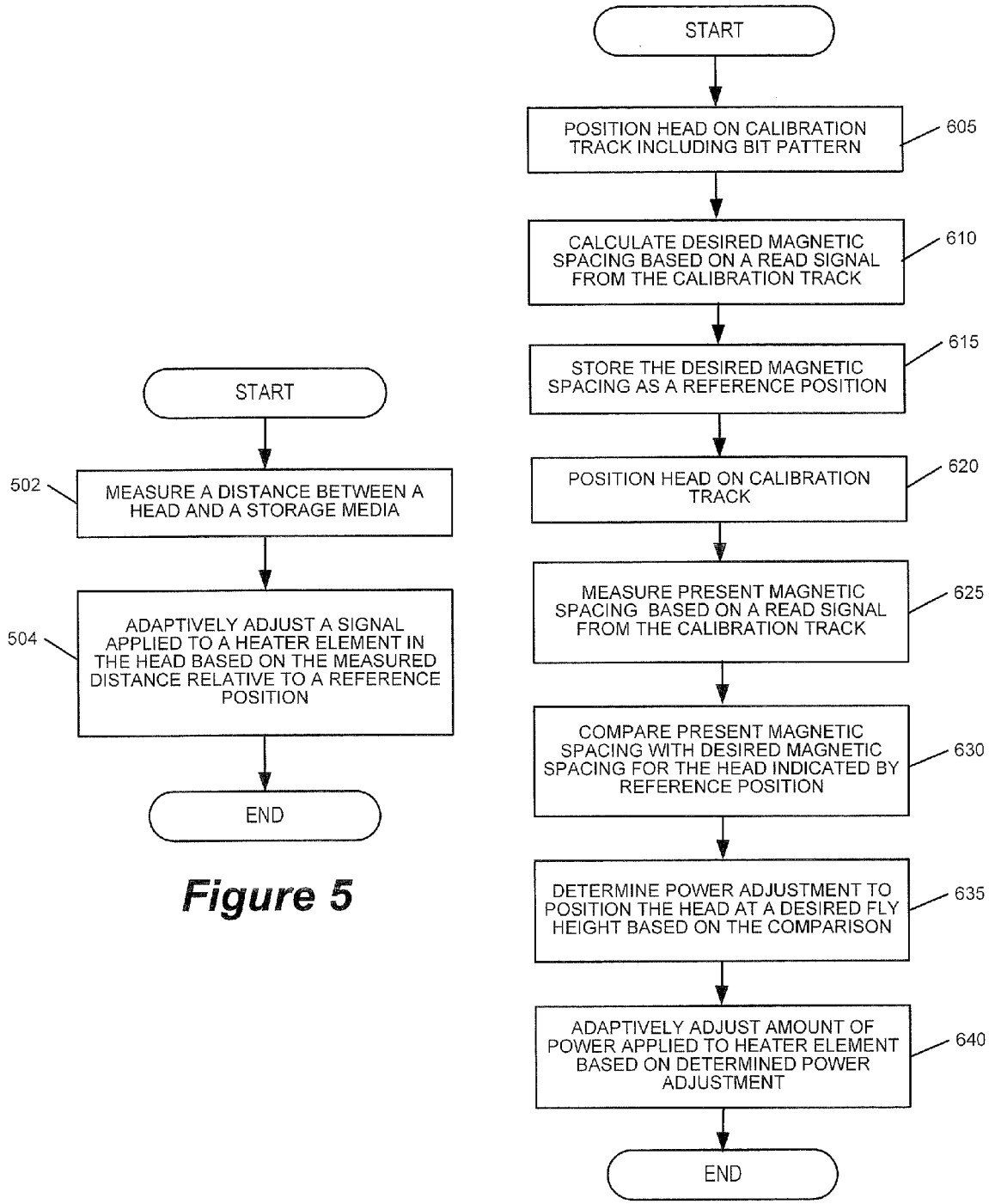
FIGS. 5 and 6 are flowcharts that illustrate operations for closed loop fly height control in accordance with some embodiments.

Still referring to FIGS. 4 and 6, the head spacing estimator 300 may compare the present magnetic spacing with the desired magnetic spacing for the head 20a as determined from the corresponding reference position in the table 310 (at block 630), and the heater controller 304 may determine a power adjustment to position the head 20a at a desired fly height based on the comparison (at block 635). For example, the heater controller 304 may calculate an error signal based on the comparison between the present and desired magnetic spacings for the head 20a, filter the error signal, and calculate the power adjustment based on the filtered error signal.

In addition, in some embodiments, the heater controller 304 may determine the power adjustment based on a minimum clearance between the head 20a and the disk 34a such that a substantially constant physical clearance may be maintained between the lowest point of the head 20a and the adjacent surface 45 of the disk 34a. For example, as power is applied to the head 20a to change the fly height, physical distortions may be induced due to thermal gradients and/or different thermal coefficients of expansion of the elements within the head 20a, such as read/write element 30. As such, the magnetic spacing between the read/write element 30 and the magnetic layer 42 of the disk 34a and the distance between the lowest point of the head 20a and the surface 45 of the disk 34a (i.e., the minimum head clearance) may vary as a function of the amount of power applied to the heater element 68a. Accordingly, the head spacing estimator 300 may calculate a relationship between applied power, minimum head clearance, and magnetic spacing based on coefficients of thermal expansion of the head 20a and/or elements thereof. This relationship may be a linear function, and may be calculated on a per head basis. However, higher order functions may also be used. Thus, the head spacing estimator 300 may determine a present minimum clearance of the head 20a based on the present magnetic spacing, the amount of thermal expansion of the head 20a, and the amount of applied power to the heater element 68a using the calculated relationship.

The heater controller 304 may determine the power adjustment for the heater element 68a based on the present minimum clearance relative to the corresponding reference position from the table 310. For example, the head spacing estimator 300 may offset the reference position for the head 20a based on the difference between the present magnetic spacing and the present minimum clearance to provide an offset reference position. The head spacing estimator 300 may compare the present magnetic spacing with the offset reference position, and the heater controller 304 may determine the power adjustment based on the results of the comparison from the head spacing estimator 300. The power adjustment may be used to maintain the lowest point of the head 20a at a desired distance from the disk 34a. By keeping the lowest point of the head 20a at the minimum safe operating clearance, the magnetic performance of the head 20a may be improved.

Again referring to FIGS. 4 and 6, the heater controller 304 may adaptively adjust the power applied to the heater element 68a based on the determined power adjustment (at block 640). More particularly, the heater controller 304 may include a heater value table 314 that correlates head spacing into digital heater values. The digital heater values may be converted by a digital-to-analog converter (DAC) into an analog voltage to generate a height adjustment signal 59, which is selectively applied to one of the fly height adjust (FHA) heater elements 68a-d based on a selected one of the heads 20a-d. As such, in some embodiments, the heater controller 304 may dynamically regulate the height adjustment signal 59 based on the power adjustment calculated for the head 20a, and thus, may adaptively adjust the amount of power supplied to the heater element 68 a to drive the head 20a back to the reference position. For example, the heater controller 304 may adaptively adjust the amount of power applied to the heater element 68a when a difference between the present magnetic spacing and the desired magnetic spacing exceeds a predetermined threshold, such as 0.5 nm.

Accordingly, the head spacing estimator 300 and the heater controller 304 of the fly height controller 57 may attempt to compensate for changes in the fly height of the head 20a using a closed loop/feedback system. It is to be understood that, although various embodiments have been described herein with reference to the head 20a, the operations discussed above with reference to FIG. 4 may be similarly performed for one or more of the other heads 20b-d. As such, the heater controller 304 may separately adjust amounts of power applied to the respective heater elements 68a-d in the corresponding ones of the heads 20a-d.

Figure 7:
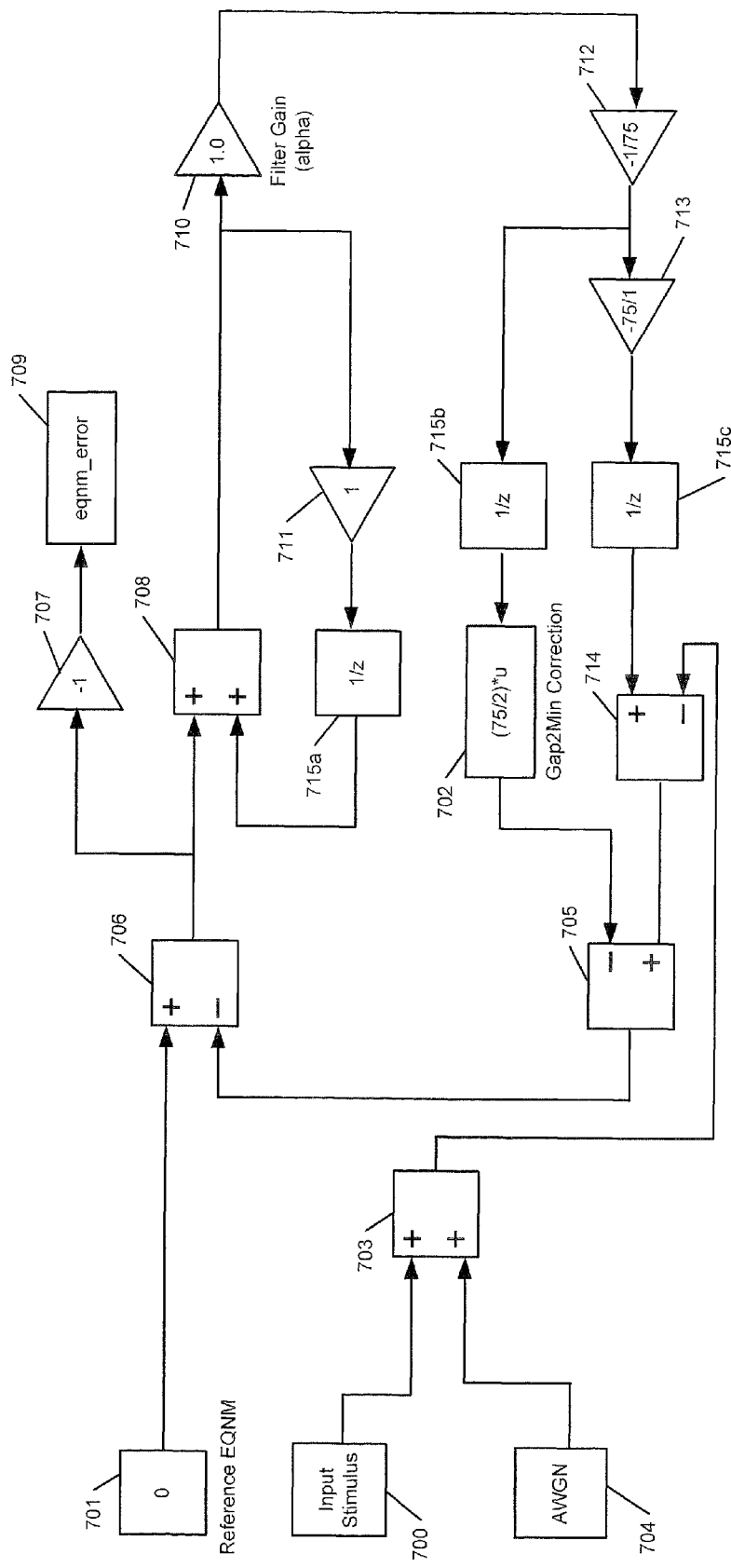
FIG. 7 is more detailed block diagram of the fly height controller of FIG. 4 and associated methods in accordance with some embodiments.
Figure 8A:
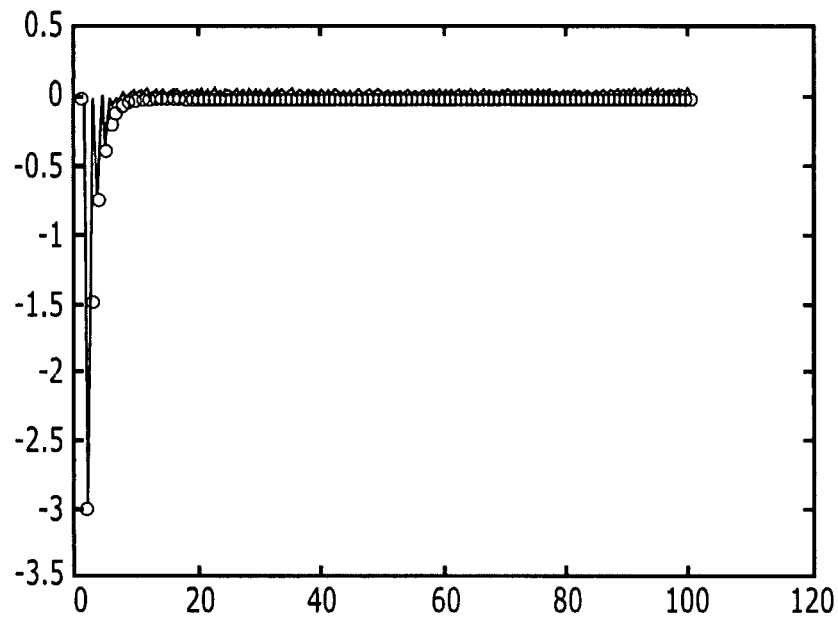
FIGS. 8A and 8B are graphs illustrating adaptive adjustment of fly height in accordance with some embodiments.
Figure 8B:
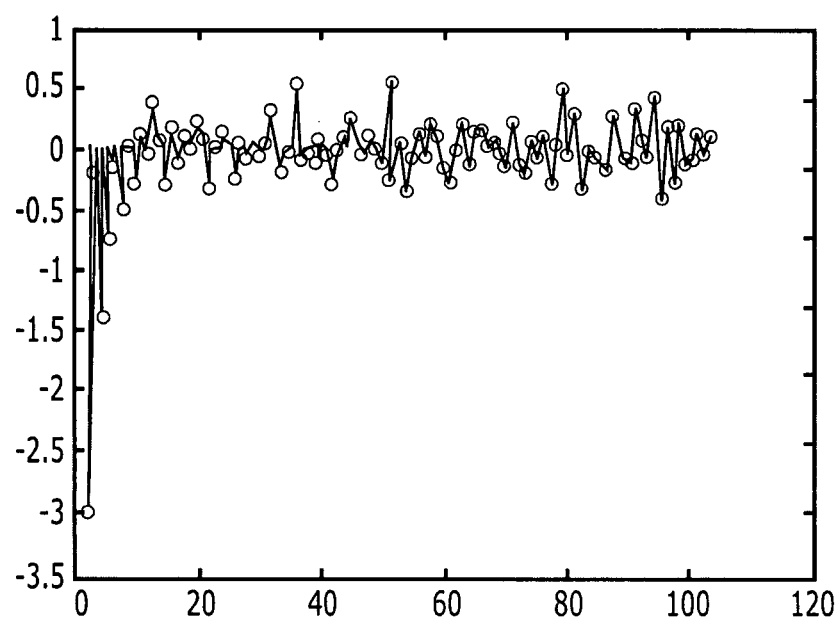

FIG. 7 is a more detailed block diagram of the fly height controller 57 of FIG. 4. FIGS. 8A and 8B illustrate results of adaptive adjustment of fly height according to some embodiments with no additive noise (FIG. 8A) and with additive noise (FIG. 8B).

Specific control algorithms for fly height monitoring (FHM) according to some embodiments will now be described with reference to FIG. 7. In some embodiments, the fly height controller 57 may be triggered to measure the distance between the head and the disk and/or adaptively adjust the heater element power based on a fixed interval timer. The timer interval may be programmable, for example, via a 'feature control' command. As each time period expires, the control algorithm may be applied to one or more heads and/or zones, and in some embodiments, may support up to four zones per head. A thermal compensation algorithm may be applied to compensate for environmental pole-tip protrusion (PTP) changes. Accordingly, remaining fly height deviations from the reference position may be due to altitude. As used herein, a "cycle" refers to each time the fly height timer expires. Also, an "iteration" refers to each loop in a cycle for a given head/zone location. For example, up to three iterations may occur for a given head/zone location. The control algorithm may be iterated up to three time for a given location (i.e., a given head and/or zone). One or more delays (at 715a, 715b, and 715c) may also be implemented. In addition, n refers to the value of the present iteration, while n−1 refers to the value from the previous iteration.

Referring to FIG. 7, a variable gain amplifier (VGA) and/or frequency harmonics measurement is performed (at 700) for a given head/zone using a frequency ratio mode. Host commands to access the disk resources may be queued during this measurement. However, other parts of the control algorithm may be interruptible by host commands from a disk resource point of view. In some embodiments, a maximum duration of consecutive interrupts by such measurements may be limited in time. A present magnetic spacing (EQNM(n)) may be calculated (at 703) from the measured VGA and/or harmonic data (and any additive noise (at 704)) based on the Wallace model. A minimum gap correction gap2min may be calculated (at 702) based on a previous iteration's correction power (in mW). For example, the minimum gap correction may be calculated by the following equation:

$$\text{gap2min\_nm}(n) = -P(n-1) * \text{Gap2min\_coeff}, \quad (1)$$

where P(n−1) is the previous iteration's correction power and P(0−1) is the correction power from the last duration of the previous cycle. Also, Gap2min_coeff is a coefficient representing the relative change in reader gap to the lowest point on the head per actuation power, and may be used to control a minimum physical clearance of the head rather than magnetic clearance of the read/write element. As such, Gap2min_coeff may be a constant initially provided by read/write and/or head-disk interface engineers, and/or may be calibrated from the measured VGA and/or harmonic data after each TD/backoff. Also, Gap2min_coeff may be derived from characterizing drives and/or calibrated on individual drive basis.

Still referring to FIG. 7, a net feedback FB(n) is calculated (at 705) as follows:

$$FB(n)=EQNM(n)+\text{gap2min\_nm}(n) \quad (2)$$

Also, a current temperature T is determined. For example, for each cycle, temperature readings from both an internal thermistor and the channel may be taken. If the difference between the two readings is greater than a self-test (ST) established differential limit, FHM may be skipped for the cycle to avoid incorrect compensation which may result from thermal impact on the VGA measurement. However, this may require calibration of the temperature differential between the two sensors, for example, during self-test in the manufacturing process.

To reduce the impact of temperature on reference position, a set of reference positions across a temperature range may be stored in the drive during the manufacturing process. A reference position ref_EQNM(n) for the current temperature T is determined (at 701) based on the Wallace model using self-test data (for example, from a look-up table) and/or may be extrapolated for temperatures outside of the baseline data. A fly height error E(n) (in nanometers) is then calculated (at 706) based on the reference EQNM and the net feedback as follows:

$$E(n)=\text{ref\_}EQNM(T)-FB(n), \quad (3)$$

where n has a value in the range [0 ... 2] for 3 iterations. If the fly height error E(n) is less than a predetermined limit FHM_limit (for example, 0.5 nm), the existing iteration loop (and thus, the adaptive adjustment of the heater power based on the current fly height error) is terminated.

As shown in FIG. 7, an integrated error X(n) is calculated (at 708) as follows:

$$X(n)=E(n)+k*X(n-1), \quad (4)$$

where k (at 711) is a constant (for example, set to 1), and X(0−1) is zero. Also, a correction or offset F(n) is calculated (at 710) based on the integrated error X(n) as follows:

$$F(n)=\text{alpha}*X(n), \quad (5)$$

where alpha is a constant.

A correction power P(n) for the next iteration is determined (at 712) from the correction amount or offset F(n) as follows:

$$P(n)=(-1)*F(n)/S, \quad (6)$$

where S is the FHA expansion coefficient calibrated by the drive. P(n) is also used for the next iteration (at 713) to compensate for the minimum gap changes due to actuation power changes. The inverter(−1) (at 707) may be used because a positive EQNM error (at 709) may indicate a fly height lower than the reference position ref_EQNM(n), and thus, a need to reduce power.

A current actuation act_nm[n] is determined from the digital to analog converter (DAC). A new actuation A(n) (in nanometers) is calculated (at 714) based on the current actuation act_nm[n] and the offset F(n) as follows:

$$A(n)=\text{act\_nm}[n]+F(n) \quad (7)$$

The selected actuation value may be compared to an equivalent actuation amount opti_act_nm at the current temperature using an environmental PTP compensation algorithm, where opti_act_nm is the actuation amount established during self-test for the reference fly height. Accordingly, if the new actuation value A(n) is greater than the actuation amount opti_act_nm, the iteration loop is terminated. This may be because FHM is meant for high altitude compensation, and thus, may not be actuated more than the selected actuation value for the same temperature. Since a correction may not be applied in this iteration, the correction power P(n) may be set to zero for the next iteration.

As discussed above, interpolation may be performed based on the results of the zones where FHM is run. This may be performed for all heads after all iteration loops for all locations have been completed. If only outer diameter (OD) and inner diameter (ID) are tested, the remaining zones may require adjustment based on a predetermined profile rather than based on interpolation. Also, as discussed above, one or more constants may be dependent on head type and/or preamplification. In addition, closed loop fly height monitoring (FHM) and control according to some embodiments of the present invention may not increase power-on-to-read time. However, FHM may run before a first read/write command, after power up, and/or after coming out of a standby mode. To accomplish this, the FHM disk resource request may need to be queued at a higher priority level than normal read/write commands.

To reduce and/or minimize risk of head-disk contact/touch-down, the maximum time delay for each iteration may be limited. Accordingly, the FHM timer may, in some embodiments, be set at one minute intervals to check the present status of the last FHM disk resource request. As such, the FHM disk resource request may be promoted to a higher priority. This one-minute timer may be independent of the FHM cycle timer. Also, to reduce and/or minimize impact on drive performance, FHM measurements per location (head/zone) may be limited to about 100 ms or less. The relationships between control loops may be iteration, followed by head, followed by zone.

In the drawings and specification, there have been disclosed typical preferred embodiments and, although specific terms are employed, they are used in a generic and descriptive sense only and not for purposes of limitation, the scope being set forth in the following claims.

That which is claimed:

1. A method, comprising:
    measuring a present distance between a head and a storage media based on a feedback signal received from the head during drive operation;
    determining a relationship between the measured present distance and a minimum clearance between the head and a surface of the storage media based on a coefficient of thermal expansion of the head and a present amount of power applied to a heater element in the head;
    calculating the minimum clearance based on the measured present distance and the determined relationship;
    offsetting a reference position indicating a desired distance between the head and the storage media based on a difference between the measured present distance and the calculated minimum clearance to provide an offset reference position; and
    dynamically adjusting a signal applied to the heater element in the head in real-time in response in response to receiving the feedback signal based on the measured present distance relative to the offset reference position.

2. The method of claim 1, wherein measuring the present distance between the head and the storage media comprises:
measuring a present magnetic spacing between a read/write element of the head and a magnetic layer of the storage media without contact between the head and the storage media.

3. The method of claim 1, further comprising:
determining the reference position corresponding to a desired fly height between the head and a surface of the storage media based on an initial measurement performed under known and/or controlled conditions,
wherein the feedback signal received after determining the reference position, and
wherein dynamically adjusting the signal comprises dynamically adjusting a signal power applied to the heater element to reduce a distance between the measured present distance and the offset reference position.

4. The method of claim 3, wherein determining the reference position based on an initial measurement comprises:
measuring a desired magnetic spacing between a read/write element of the head and a magnetic layer of the storage media corresponding to the desired fly height.

5. The method of claim 4, further comprising:
writing a calibration track including a predetermined bit pattern on the storage media,
wherein measuring the desired magnetic spacing comprises calculating the desired magnetic spacing based on a read signal from the calibration track.

6. The method of claim 4, wherein measuring the present distance between the head and the storage media comprises measuring a present magnetic spacing between the read/write element of the head and the magnetic layer of the storage media, and wherein dynamically adjusting the signal power comprises:
comparing the present magnetic spacing with the magnetic spacing indicated by the offset reference position;
determining a power adjustment based on the comparison; and
dynamically adjusting the signal power applied to the heater element based on the determined power adjustment.

7. The method of claim 1, wherein dynamically adjusting the signal comprises:
dynamically adjusting the signal applied to the heater element when the difference between the measured present distance and the offset reference position exceeds a predetermined threshold.

8. The method of claim 1, wherein measuring the present distance between the head and the storage media comprises:
positioning the head on a calibration track including a predetermined bit pattern;
reading data from the calibration track to provide the feedback signal; and
measuring the present distance based on the feedback signal from the calibration track.

9. The method of claim 1, further comprising:
receiving the feedback signal responsive to detecting changes in temperature and/or pressure.

10. The method of claim 1, further comprising:
receiving the feedback signal responsive to detecting a read and/or write error rate that is greater than a predetermined threshold.

11. The method of claim 1, further comprising:
determining respective reference positions corresponding to desired fly heights for a plurality of heads relative to respective surfaces of adjacent storage media;
receiving respective feedback signals from the plurality of heads;
measuring respective present distances between ones of the plurality of heads and corresponding ones of the adjacent storage media based on the respective feedback signals;
offsetting the respective reference positions based on respective differences between the respective measured present distance and respective minimum clearances between the ones of the plurality of heads and the respective surfaces of the adjacent storage media based on respective coefficients of thermal expansion of the heads and respective present amounts of power applied to respective heater elements in the plurality of heads to provide respective offset reference positions; and
separately adjusting amounts of power applied to the respective heater elements in the ones of the plurality of heads in real-time in response to the respective feedback signals based on the respective measured present distances relative to the respective offset reference positions.

12. A circuit, comprising:
a controller that measures a present distance between a head and a storage media based on feedback signal received from the head the during drive operation, determines a relationship between the measured present distance and a minimum clearance between the head and a surface of the storage media based on a coefficient of thermal expansion of the head and a present amount of power applied to a heater element in the head, calculates the minimum clearance based on the measured present distance and the determined relationship, offsets a reference position indicating a desired distance between the head and the storage media based on a difference between the measured present distance and the calculated minimum clearance to provide an offset reference position, and dynamically adjusts a signal applied to the heater element in the head in real-time in response to receiving the feedback signal based on the measured present distance relative to the offset reference position.

13. The circuit of claim 12, wherein the controller comprises:
a head spacing estimator that measures the present distance between the head and the storage media and determines the reference position corresponding to a desired fly height between the head and a surface of the storage media based on an initial measurement performed under known and/or controlled conditions prior to measuring the distance; and
a heater controller that dynamically adjusts a signal power applied to the heater element to reduce a distance between the measured present distance and the offset reference position.

14. The circuit of claim 13, wherein the reference position indicates a desired magnetic spacing between a read/write element of the head and a magnetic layer of the storage media corresponding to the desired fly height, wherein the measured present distance comprises a present magnetic spacing between the read/write element of the head and the magnetic layer of the storage media, wherein the head spacing estimator compares the present magnetic spacing with the magnetic spacing indicated by the offset reference position, and wherein the heater controller determines a power adjustment based on the comparison and dynamically adjusts the signal power applied to the heater element based on the determined power adjustment.

15. The circuit of claim 13, wherein the controller further comprises:
- a servo controller that positions the head on a calibration track on the surface of the storage media including a predetermined bit pattern,
- wherein the head reads data from the calibration track to provide the feedback signal, and wherein the head spacing estimator measures the present distance between the head and the storage media based on the feedback signal from the calibration track.

16. A method, comprising:
- receiving a feedback signal indicating a present distance between a head and a rotatable storage disk; and
- dynamically providing an adjustment signal to the head in real-time responsive to receiving the feedback signal,
- wherein the adjustment signal is based on the present distance relative to a reference position indicating a desired distance between the head and the storage media that is offset based on a difference between the present distance and a minimum clearance between the head and the rotatable storage disk, wherein the minimum clearance is calculated based on the present distance, a coefficient of thermal expansion of the head, and a present amount of power applied to the end of the head, and wherein the adjustment signal is configured to reduce a difference between the present distance and the offset reference position.

17. The method of claim 16, wherein the feedback signal comprises a read signal from the head, and further comprising:
- determining the present distance as a magnetic spacing between a read/write element of the head and a magnetic layer of the disk based on the read signal.

18. The method of claim 16, wherein providing the adjustment signal comprises:
- providing a heater signal to a heater element in the head in real-time, wherein a power of the heater signal is based on the present magnetic spacing relative to a magnetic spacing between the read/write element and the magnetic layer indicated by the offset reference position.

19. The method of claim 16, wherein the feedback signal comprises a first feedback signal, wherein the present distance comprises a first distance, and wherein the adjustment signal comprises a first adjustment signal, and further comprising:
- receiving a second feedback signal from the head in response to the first adjustment signal, wherein the second feedback signal indicates a second distance between the head and the storage media that is closer to the offset reference position than the first distance; and
- dynamically providing a second adjustment signal to the head in real-time responsive to receiving the second feedback signal, wherein the second adjustment signal is based on the second distance relative to the offset reference position and is configured to reduce a difference therebetween.

\* \* \* \* \*